United States Patent
Garwood

[15] 3,696,786
[45] Oct. 10, 1972

[54] SELF-CLEANING BIRD BATH

[72] Inventor: Moody Ray Garwood, 781 Kiwana Drive, Youngstown, Ohio 44512

[22] Filed: April 23, 1971

[21] Appl. No.: 136,942

[52] U.S. Cl. ................................................ 119/1
[51] Int. Cl. ........................ A01k 15/00, A01k 29/00
[58] Field of Search ............................ 119/1, 74, 56

[56] References Cited

UNITED STATES PATENTS

| 1,019,881 | 3/1912 | Byrd | 119/74 |
| 1,029,623 | 6/1912 | Nieman | 119/74 |
| 1,219,114 | 3/1917 | Lappas | 119/56 |
| 1,806,123 | 5/1931 | Smith | 119/1 |
| 2,165,753 | 7/1939 | Hobbs | 119/74 |
| 2,446,695 | 8/1948 | Didget | 119/74 |

Primary Examiner—Aldrich F. Medbery
Attorney—Webster B. Harpman

[57] ABSTRACT

A self-cleaning bird bath having a vertical support stand, a shallow bowl pivoted to the upper end thereof and incorporating an overflow channel therein and a weighted area. A container is attached to the shallow bowl at a point opposite to the weighted area and in a position to receive water from the overflow channel whereby water entering the overflow channel will be directed into the container so as to over balance the weighted area of the shallow bowl and cause the same to tip and discharge the contents thereof. Drain means in the container acts to empty the same whereby the shallow bowl returns to horizontal, normal position.

5 Claims, 2 Drawing Figures

PATENTED OCT 10 1972

3,696,786

INVENTOR.
Moody Ray Garwood.
BY
W. B. Hartman
ATTORNEY.

SELF-CLEANING BIRD BATH

BACKGROUND OF THE INVENTION

1. Field of the Invention

This invention relates to bird bath structures such as used for practical and decorative purposes in gardens.

2. Description of the Prior Art

Prior structures of this type have generally comprised stands with shallow bowls on their upper ends and in fixed relation thereto. Some bird baths have incorporated fountains and the like. No structures are known wherein the bird bath itself is tiltable so as to be self-cleaning upon the introduction of additional water thereto. Typical bird baths are found in U.S. Pat. Nos. 1,806,123; 1,354,113; 2,583,911 and 2,938,495.

The present invention comprises a simple automatically operating attractive mechanism which is self-cleaning upon the presence of extra water added to the shallow bowl of the bird bath.

SUMMARY OF THE INVENTION

A self-cleaning bird bath is disclosed which comprises a vertical stand having a base with a pivot member at its uppermost end to which a shallow bowl is pivoted so that it can be tilted sideways so as to discharge the contents therefrom. The shallow bowl is weighted at one side of the pivot so as to be normally biased to horizontal position and provided with an overflow passageway and an associated container connected to the opposite side of the shallow bowl so that water in the bird bath overflowing will enter the container and weight the same so as to cause the shallow bowl of the bird bath to tilt to discharge the contents. Small openings in the container or valve means act to discharge the contents therefrom and permit the bird bath bowl to return to horizontal, normal position.

DESCRIPTION OF THE PREFERRED EMBODIMENT

In its simplest form the bird bath of the present invention comprises a base 10 having a cylindrical vertical stand 11 positioned thereon and extending upwardly therefrom. The upper end of the cylindrical stand 11 pivotally receives a shallow bowl 12 which has a rim 13.

Figure 1:
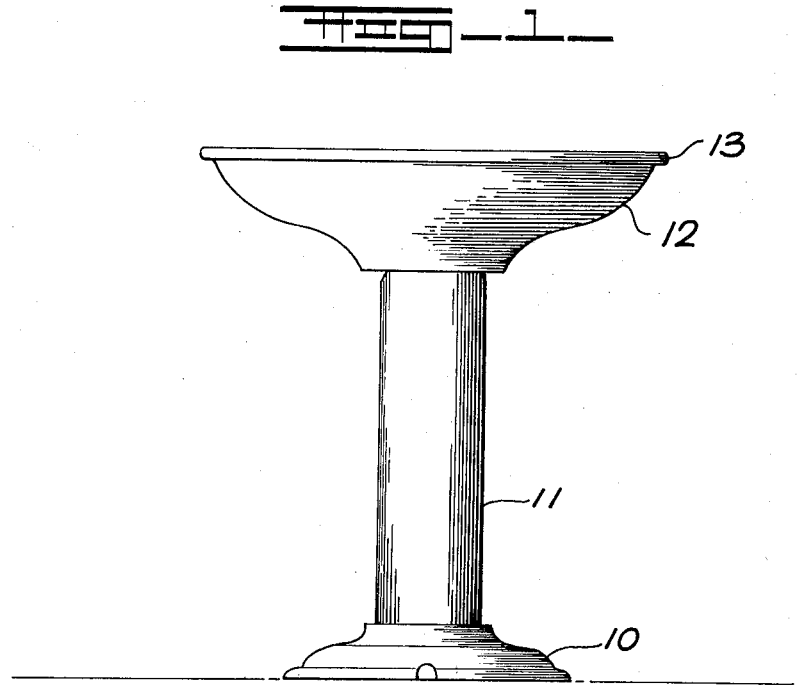
FIG. 1 is a side elevation of the bird bath showing the same in normal, upright position.
Figure 2:
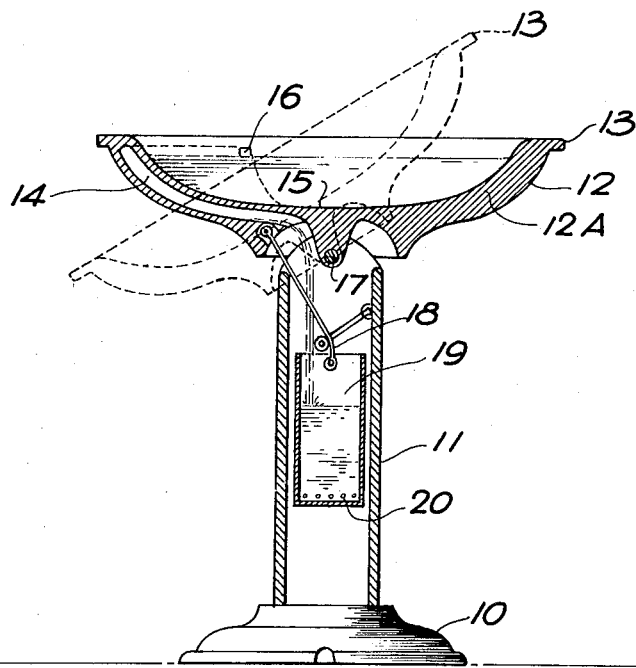
FIG. 2 is a vertical section through the bird bath with broken lines indicating the tilted position of the bowl thereof.

By referring to FIG. 2 of the drawings it will be seen that the cylindrical stand 11 is hollow and that a container 19 is movably positioned therein and supported by a flexible carrier 18, the upper end of which is attached to one side of the shallow bowl 12 opposite to a thickened area 12A of the shallow bowl which provides weight normally holding the shallow bowl in horizontal position as seen in solid lines in FIG. 1 and FIG. 2.

The opposite side of the shallow bowl 12 has a hollow configuration defining a chamber 14 which has an opening 15 at its lowermost end above the upper end of the cylindrical stand 11. An overflow opening 16 is formed in the shallow bowl at one side thereof and communicates with the chamber 14. The shallow bowl 12 is pivoted as by a pivot pin 17 to the upper end of the cylindrical stand 11 which is shaped to permit the shallow bowl 12 to tilt to a position where all of the water and any debris therein will be washed therefrom as by rain or water from another source directed into the bird bath.

Still referring to FIG. 2 of the drawings it will be observed that when additional water is placed in the shallow bowl 12 of the bird bath it will run out through the overflow opening 16 into the chamber 14 and through the opening 15 thereof into the upper end of the cylindrical stand 11 and thus, into the open upper end of the container 19. The container 19 has a plurality of very small openings 20 adjacent its lowermost end or alternately a quick acting dump valve (not shown).

The water from the overflow opening 16 will be largely retained in the container 19 and thereby increase its weight which will be transferred by way of the flexible carrier 18 to the one side of the shallow bowl 12 and be sufficient to cause it to tilt to the position shown in broken lines in FIG. 2 whereupon all of the water contents and any debris will be washed therefrom.

The openings 20 in the container will eventually drain the water therefrom whereupon the weighted portion 12A of the shallow bowl 12 will overcome the weight of the container 19 and the shallow bowl 12 will return to normal horizontal position where it can be refilled.

Although but one embodiment of the present invention has been illustrated and described it will be apparent to those skilled in the art that various changes and modifications may be made therein without departing from the spirit of the invention and having thus described my invention, what I claim is:

1. In a bird bath a combination of a vertical stand and a shallow bowl pivoted to the upper end thereof so as to be tiltable relative thereto, a weight on one side of said shallow bowl normally biasing the same to horizontal position and an overflow passageway in said bowl, a container suspended from said bowl on the opposite side thereof with respect to said weight and arranged to receive water flowing through said overflow passageway.

2. The bird bath set forth in claim 1 and wherein the weight on one side of the shallow bowl is integral therewith.

3. The bird bath set forth in claim 1 and wherein the overflow passageway communicates with the shallow bowl adjacent the rim thereof and at a location on the same side of the pivot with respect to said weight.

4. The bird bath set forth in claim 1 and wherein one half of the shallow bowl is thick and solid and the other half is hollow and the thick and hollow halves are on opposite sides of said pivot.

5. The bird bath set forth in claim 1 and wherein the weight is separate and attached to said shallow bowl.

* * * * *